United States Patent
Ferro et al.

(10) Patent No.: US 7,930,404 B2
(45) Date of Patent: Apr. 19, 2011

(54) CROSS-SYSTEM LOG IN A DISTRIBUTED SYSTEM ENVIRONMENT

(75) Inventors: Cristina Ferro, Villeneuve-Loubet (FR); Uwe E. Fischer, Karlsruha (DE); Olivier Ficatier, Nice (FR); Axel Haury, Le Cannet (FR); Gordon Muehl, Oestringen (DE); Ebru Polat, Antibes (FR); Lutz Rosenpflanzer, Valbonne (FR); Jochen Schmitt, Antibes (FR); Robert Lang, Wiesloch (DE); Bernhard Suchanek, Baden Baden (DE); Alexandra Suchanek, legal representative, Baden Baden (DE)

(73) Assignee: SAP AG, Walldorf (DE)

( * ) Notice: Subject to any disclaimer, the term of this patent is extended or adjusted under 35 U.S.C. 154(b) by 1054 days.

(21) Appl. No.: 11/180,551

(22) Filed: Jul. 14, 2005

(65) Prior Publication Data

US 2006/0206612 A1    Sep. 14, 2006

(30) Foreign Application Priority Data

Mar. 9, 2005    (EP) .................................. 05 290 532

(51) Int. Cl.
  *G06F 15/16*    (2006.01)
  *G06Q 10/00*    (2006.01)
  *G06F 13/42*    (2006.01)

(52) U.S. Cl. ............. 709/227; 709/249; 705/1; 340/825
(58) Field of Classification Search .................. None
  See application file for complete search history.

(56) References Cited

U.S. PATENT DOCUMENTS

| | | | |
|---|---|---|---|
| 5,745,686 A | 4/1998 | Saito et al. | |
| 6,047,353 A | 4/2000 | Vishlitzky et al. | |
| 6,415,331 B1* | 7/2002 | Ariga | 709/246 |
| 7,516,132 B1* | 4/2009 | Fast et al. | 707/8 |
| 2004/0060018 A1* | 3/2004 | Tran et al. | 716/4 |
| 2004/0078622 A1* | 4/2004 | Kaminsky et al. | 714/4 |
| 2005/0033588 A1* | 2/2005 | Ruiz et al. | 705/1 |
| 2006/0026672 A1* | 2/2006 | Braun | 726/9 |
| 2006/0085609 A1* | 4/2006 | Ninose et al. | 711/162 |

FOREIGN PATENT DOCUMENTS

EP    0 913 744 A2    5/1999

* cited by examiner

*Primary Examiner* — Ario Etienne
*Assistant Examiner* — Ho Shiu
(74) *Attorney, Agent, or Firm* — Finnegan, Henderson, Farabow, Garrett & Dunner, LLP (57) ABSTRACT

Embodiments consistent with the invention provide a computer-implemented method for providing a cross-system log in a distributed computer system environment having multiple computer systems. The method comprises electronically receiving data in a first system, the data including cross-system characteristics of a cross-system activity originating from a second computing system, electronically storing the data, electronically receiving a request to access the data, and electronically providing the requested data.

17 Claims, 4 Drawing Sheets

CROSS-SYSTEM LOG IN A DISTRIBUTED SYSTEM ENVIRONMENT

TECHNICAL FIELD

The present invention generally relates to data logging, and, more particularly, to systems and methods for cross-system data logging in distributed system environments.

BACKGROUND

Distributed systems have become commonplace in today's ever-expanding global computing environment. Distributed systems provide a collection of independent systems that process tasks on multiple systems in such a way that system boundaries appear transparent to the user. That is, it appears to the user that all the processing is performed on the user's local system. Today's distributed systems also provide local logging of activities that occur on each independent system to provide, for example, performance measurement of the distributed system or troubleshooting of the distributed system in the event of processing errors, etc. However, many activities in a distributed system environment affect more than one system. Such activities are known as "cross-system" activities. Examples of cross-system activities include changes in services provided by the multiple systems or changes in software libraries or application program interfaces provided by the multiple systems.

Logging is also performed for such cross-system activities. In current distributed system environments, log entries for a cross-system activity are made in local logs. However, these local logs do not record the cross-system characteristics of the activity. For example, these local logs do not record data specifying the system on which these cross-system activities originated, nor do they record the cause of the "log-worthy" activity. As a consequence, today's systems fail to provide full characterization of cross-system activities.

Therefore, there is a need in the art of distributed systems to provide logging of cross-system characteristics of cross-system activities and events.

SUMMARY

Accordingly, embodiments consistent with the present invention may relate to cross-system logging in distributed system environments and methods that may alleviate one or more of the limitations or disadvantages existing in the related art.

Embodiments consistent with the invention provide a computer-implemented method for providing a cross-system log in a distributed computer system environment having multiple computer systems. The method comprises electronically receiving data in a first system, the data including cross-system characteristics of a cross-system activity originating from a second computing system, electronically storing the data, electronically receiving a request to access the data, and electronically providing the requested data.

Embodiments consistent with the invention also provide a computer-implemented method for transmitting cross-system data for use in a cross-system log in a distributed computer system environment having multiple computer systems. The method comprises electronically acquiring data at a first system including cross-system characteristics of a cross-system activity, wherein the activity affects a second system within the distributed system environment and electronically transmitting the data for storage in the cross-system log.

Embodiments consistent with another aspect of the invention provide a computer program product including instructions for execution by a processor to perform a method for providing a cross-system log in a distributed computer system environment having multiple computer systems. The method comprises electronically receiving data in a first system, the data including cross-system characteristics of a cross-system activity originating from a second computing system, electronically storing the data, electronically receiving a request to access the data, and electronically providing the requested data.

Embodiments consistent with yet another aspect of the invention provide a computer system for providing a cross-system log in a distributed computer system environment having multiple computer systems. The system comprises a component for electronically receiving data in a first system, the data including cross-system characteristics of a cross-system activity originating from a second computing system, a component for electronically storing the data, a component for electronically receiving a request to access the data, and a component for electronically providing the requested data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention.

DEFINITIONS

As used in the description herein, "business object" refers to a collection of data that may belong together from a business point of view. For example, a "sales" business object could include marketing data, sales data, vendor data, etc. or a "product" business object could include dimensions, weight, units of measure, standard price, global trade number, etc. Similarly, a "business partner" business object could include address, bank account number, payment card information, etc. or a "sales order" business object could include pricing, ordering customer, dead line, etc. "Local change document" refers to a local log for logging changes to business objects.

DETAILED DESCRIPTION

Reference will now be made in detail to exemplary embodiments consistent with the invention, examples of which are illustrated in the accompanying drawings. Wherever possible, the same reference numbers will be used throughout the drawings to refer to the same or like parts.

The following detailed description refers to the accompanying drawings. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering or, adding steps to the disclosed methods. Accordingly, the following detailed description does not limit the invention.

Embodiments consistent with the present invention are directed to systems, methods, and computer-readable media for cross-system logging. Embodiments consistent with the invention may be implemented in various environments, including computer-based environments, such as personal computers, workstations, servers, laptops, personal digital assistants (PDAs), mobile phones, handheld devices, and other computing devices, workstation, networked and other computing-based environments with one or more users. The present invention, however, is not limited to such examples and embodiments consistent the invention may be implemented with other platforms and in other environments.

By way of example, embodiments consistent with the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage media referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments consistent with the invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Transmission protocols and data formats are also known, such as, for example transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc. Such features may be utilized to implement embodiments consistent with the present invention, as disclosed herein.

Systems, methods, and computer-readable media, consistent with the present invention, may enable more robust auditing and troubleshooting of distributed systems. Consequently, systems, methods, and computer readable media, consistent with the present invention, log cross-system characteristics of cross-system activities and allow access to such information as may be needed. More specifically, systems, methods, and computer readable media, consistent with the present invention, transfer cross-system characteristics of a log-worthy activity or event to a central repository and enable access to the data stored at the central repository by any person or machine that may require such access.

Figure 1:
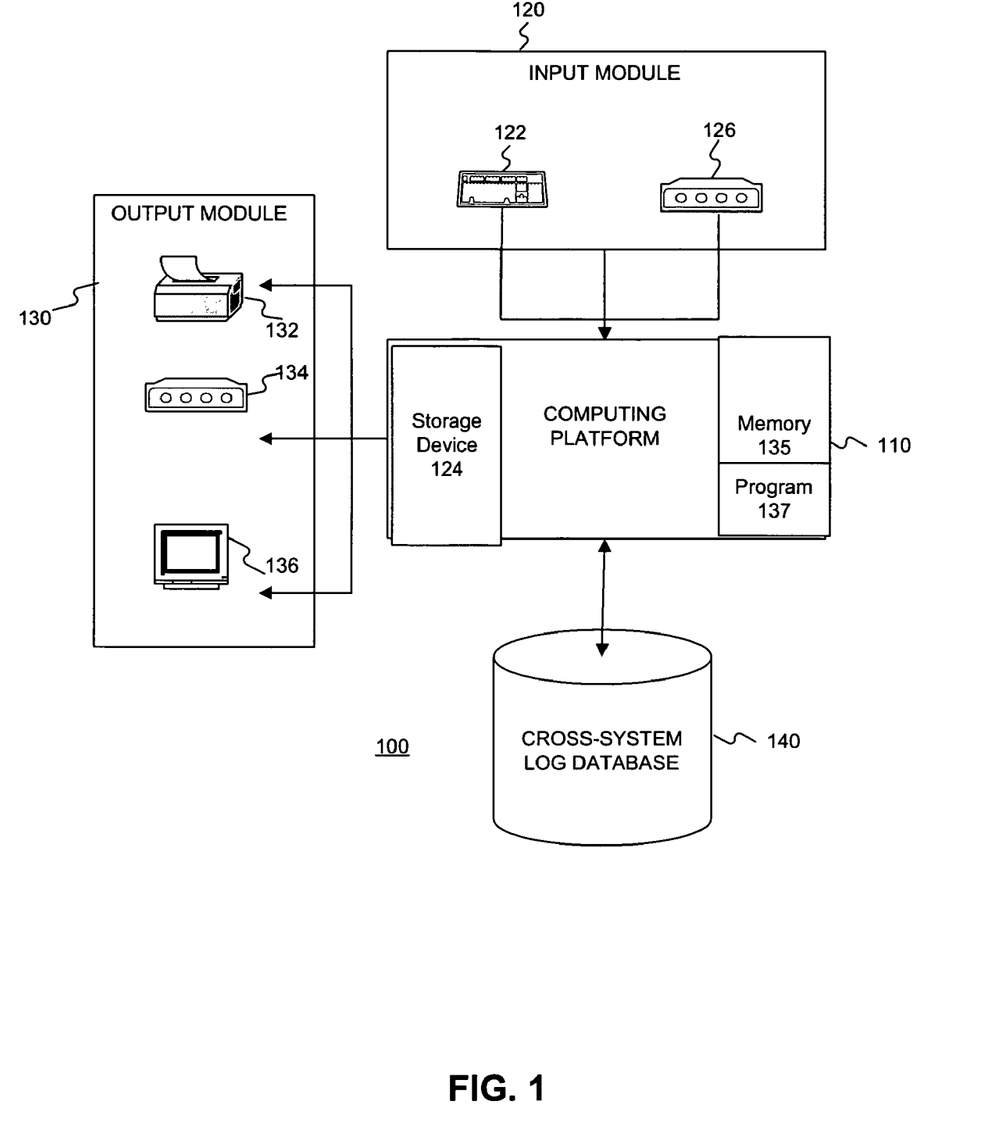
FIG. 1 illustrates an exemplary system environment in which features consistent with the present invention may be implemented.

FIG. 1 illustrates an exemplary system environment 100 in which embodiments consistent with the present invention may be implemented. As illustrated in FIG. 1, system 100 includes a computing platform 110, an input module 120, an output module 130, a memory 135, and a cross-system log database 140. Computing platform 110 is adapted to process input information received from input module 120. Computing platform 110 is further adapted to provide output information to output module 130. Additionally, computing platform 110 is adapted to access information in cross-system log database 140 for use in performing methods consistent with the present invention (discussed below).

Computing platform 110 may comprise a general purpose computer (e.g., a personal computer, network computer, server, or mainframe computer) having a processor that may be selectively activated or reconfigured by a computer program to perform one or more methods consistent with the present invention. Computing platform 110 may also be implemented in a distributed network. Alternatively, computing platform 110 may be specially constructed for carrying-out methods consistent with the present invention.

Input module 120 may include an input device 122 and/or a network interface 126. Input device 122 may be implemented using a keyboard, mouse, speech recognition device, or data entering devices. Network interface 126 may receive information over any type of network (not shown), such as a telephony-based network (e.g., PBX or POTS), a local area network, a wide area network, a dedicated intranet, and/or the Internet. Computing platform 110 may also access data stored on storage device 124. Storage device 124 may include a memory, such as RAM or ROM memory that contains instructions or data for performing one or more methods consistent with the present invention.

In maintaining cross-system log database 140, input module 120 may be used to request computing platform 110 to output information regarding the data stored in cross-system log database 140. Such requests may originate from, for example, an employee or network engineer via input device 122 or another computing system via network interface 126. Computing platform 110 may then output the requested information via output module 130.

Output module 130 may include a printer 132, an output interface 134, and/or a display 136. Printer 132 may be used to provide a printout of cross-system data to interested parties. Output interface 134 may be used to provide the cross-system data to the interested parties via the Internet, email, fax, or page, or may save the information on a computer readable medium. Output interface 134 may also be used to request more detailed cross-system characteristics information from other computing systems within the distributed system environment (discussed below). Display 136 may be used to provide the cross-system data to the interested parties visually.

Figure 2:
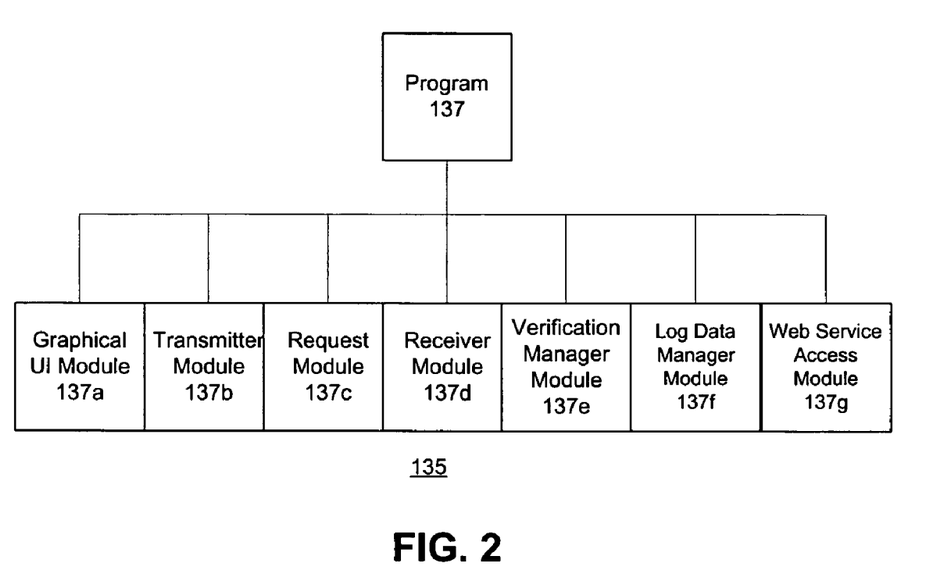
FIG. 2 is an exemplary software architecture for maintaining a cross-system log for distributed system environments, consistent with the principles of the present invention.

FIG. 2 shows memory 135 in more detail. Memory 135 contains instructions in program 137, which, when executed, perform the functions of system 100. When performing logging functions, program 137 may contain instructions in the form of software modules 137*a*-137*g*. These software modules can be written using any known programming language, such as ABAP, XML, etc. Graphical UI module 137*a* may provide a graphical user interface to display cross-system log data. Graphical UI module 137*a* may also be used as a portal for graphical content when the user interfaces of client components need to be incorporated. Transmitter module 137*b* can be used to request the transfer of cross-system log data from the client to server (i.e., system 100), either as part of a change message (discussed below) or on request. Request module 137*c* can be used to periodically request log information from clients (discussed below). Receipt module 137*d* receives log data and transfers them to Log Data Manager module 137*f*. Verification Manager module 137*e* can be used to verify that the cross-system log data is consistent. Log Data Manager module 137*f* may be used to administer the persistency of the cross-system log data. Log Data Manager module 137*f* may also include an application program interface to provide data access. Web Service Access module 137*g* may be used to provide access to the cross-system log data from remote locations.

Figure 3:
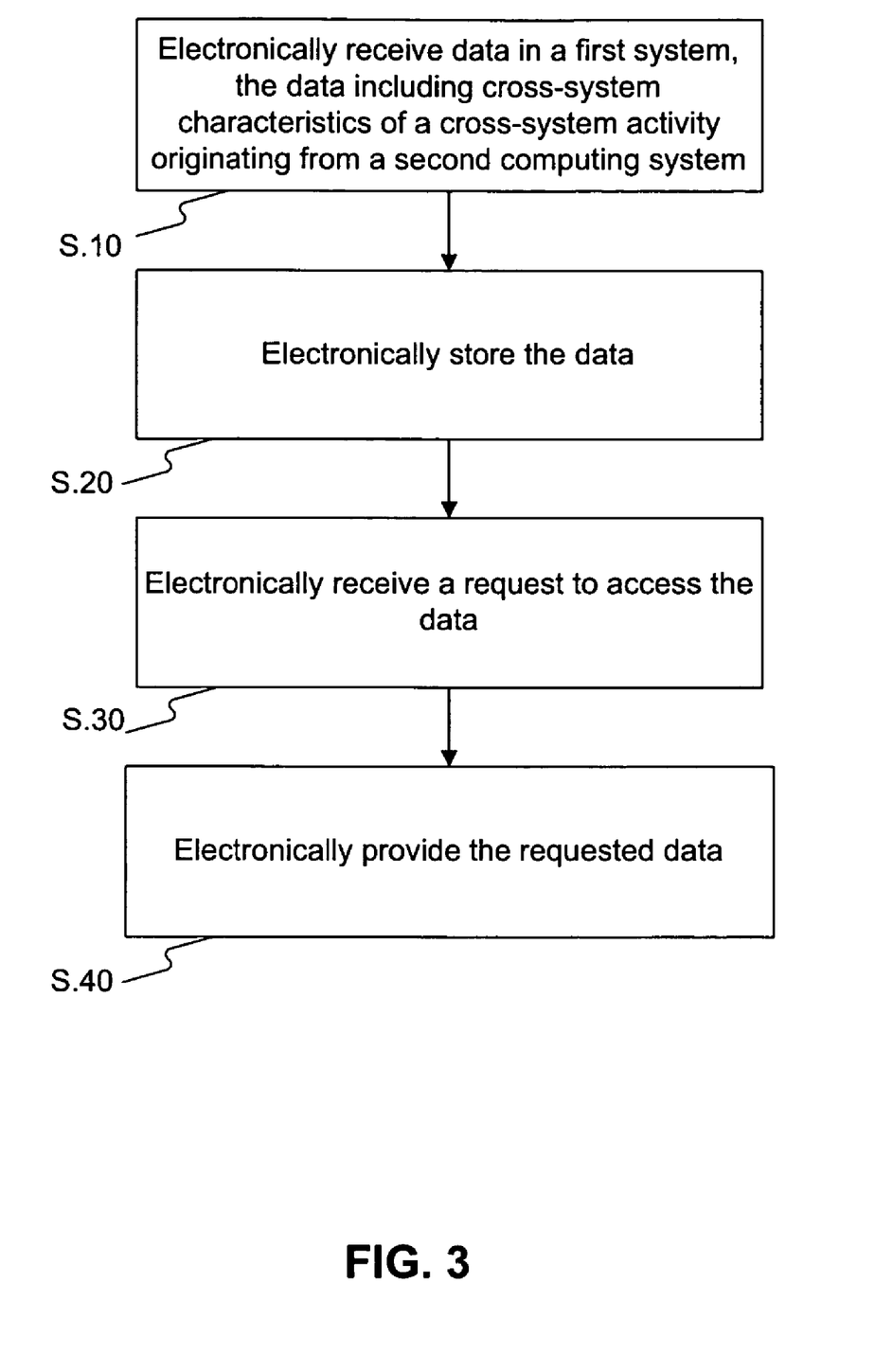
FIG. 3 is an exemplary flowchart for maintaining a cross-system log for distributed system environments, consistent with the principles of the present invention.

FIG. 3 illustrates an exemplary flowchart of a process for maintaining a cross-system log for distributed system environments, consistent with the principles of the present invention. Although the steps of the flowchart are described in a particular order, one skilled in the art will appreciate that these steps may be performed in a modified or different order. Further, one or more of the steps in FIG. 3 may be performed concurrently or in parallel.

First, computing platform 110 electronically receives data including cross-system characteristics of a cross-system activity originating from another computing system within a distributed system environment (Step S.10). In some embodiments, cross-system activities may include any manipulation of a business object in one system, if the manipulation is transferred to another system. For example, a cross-system activity can include modification of an application program interface provided by a first system and used by other systems. Another example of a cross-system activity may include the reservation of available meeting rooms by different departments in an organization, such as an accounting or sales department. In an embodiment of such a reservation service, local copies of the list of room bookings may be kept in systems located in the different departments. In this embodiment, a cross-system activity is generated when a new reservation is entered in one of the systems located in the different departments and all the local copies of the list of room bookings need to be updated.

In yet another example of a cross-system activity, a business partner may be both a customer and vendor from the point of view of a company. A cross-system activity may be generated when there is a change in address of the business partner which is noticed and entered by one department in an organization and is then communicated from the department to another department of the organization.

In yet another example of a cross-system activity, some time after having opened an account, a bank customer may ask for a loan. In order to do so, a cross-system activity may be generated to send the customer's personal data from an account computer system to a loan computer system.

Cross-system characteristics information may include data regarding the time the cross-system activity occurred, the identity of the system from which the cross-system activity originated, the identity of a business object that caused the cross-system activity, etc.

Figure 4:
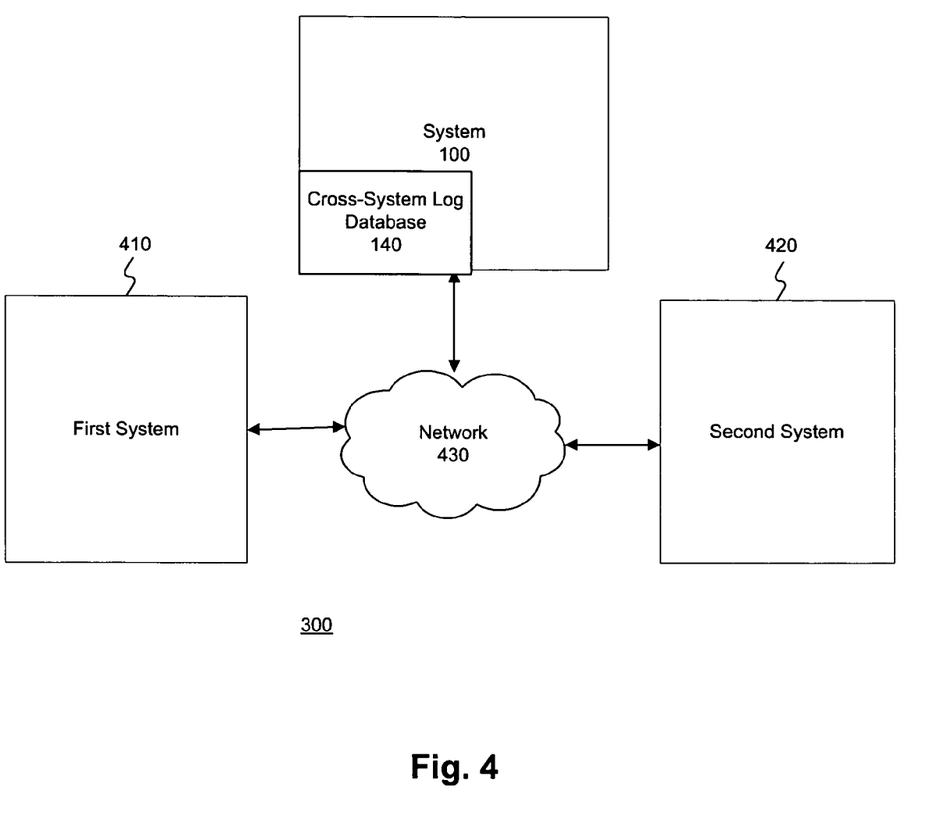
FIG. 4 is an exemplary distributed system, consistent with the principles of the present invention.

As an example, FIG. 4 illustrates an exemplary distributed system 400 that may comprise multiple computer systems, such as for example, a first system 410 and a second system 420 (as clients) and system 100 (as a server), connected through any known kind of network 430. First system 410 can be any computing system used to perform distributed tasks consistent with embodiments of the invention. For example, first system 410 may provide a word-processing service to local users and make this service available to other users interacting with other computing systems of distributed system 400, such as second system 420 and system 100.

Second system 420 can also be any computing system used to perform any distributed tasks, consistent with embodiments of the invention. For example, second system 420 may provide a dictionary service to local users and also make this service available to other users interacting with other computing systems of distributed system 400, such as first system 410 and system 100. An advantage of such a system is that second system 420 may also provide a word-processing service to a user at second system 420 without the user realizing that second system 420 is employing the word-processing service provided by first system 410. The computer systems, such as first system 410, second system 420, and system 100, could be located at any convenient location, such as at different departments of a company, at different companies, etc.

In one embodiment, a skilled artisan would appreciate that each one of the computing systems of distributed system 400 could maintain a record of services offered by the other computing systems of distributed system 400 by using any well-known process of record maintenance, such as a list. For example, in one embodiment, second system 420 could maintain a list of services available on first system 410, such as the word-processing service.

In this embodiment, activities or events that occur on any of the computing systems of distributed system 400 may have cross-system effects. For example, a change in services offered by first system 410 may have effects on second system 420 in that the list maintained by second system 420 may need to be updated to reflect the change in services offered by first system 410. As discussed above, data logging systems available today may provide local logs to be used on computing platforms, such as first system 410 and second system 420. These logs can enable the logging of local events or activities that may occur on these computing platforms locally. For example, if there had been a change in services offered by first system 410 and a message was sent to second system to update the list maintained by second system 420, local characteristics of this change or update could be recorded in the local logs maintained by first system 410 and second system 420. However, the information stored in these local logs would not include cross-system characteristics of the activities and events that caused such logging. For example, the information stored in the local log of second system 420 in response to the updating of services provided by first system 410, would not include information such as that the updates originated from a change in services provided in first system 410, the identity of task or event on first system 410 that caused the change in services, the identity of a user that initiated such changes, etc. Embodiments consistent with the invention may provide such information.

For example, if the computing systems that make up the distributed system environments contain local logging systems, then the local logging systems can transmit cross-linking information containing data such as the identity of the originating system of the cross-system activity and a timestamp for the cross-system activity to system 100. In the example discussed above, when a change in services offered on first system 410 is initiated, if first system 410 contained a local logging system, then the local logging system could transmit the cross-linking information to system 100 for logging. Subsequently, this logged cross-linking information could be accessed to obtain more detailed cross-system characteristics of the cross-system activity if required (discussed below).

On the other hand, globally unique identifiers (GUIDS) may be assigned to the cross-system activities and stored in the local logging systems. For example, in the example discussed above, when a change in services offered on first system 410 is initiated, the local logging system of first system 410 can generate a GUID for the cross-system activity. In this case, when first system 410 sends a message to second system 420 to notify second system 420 of the change in services, first system 410 also transmits the GUID of the cross-system activity. Subsequently, this information is stored by the local logging systems of first system 410 and second system 420. Thereafter, the local logging system of first system 410 and second system 420 can be periodically monitored in order to correlate the logging of the cross-system activity in second system 420 with that of first system 410 and make a corresponding entry to cross-system log database 140.

Alternatively, more detailed cross-system characteristics information could be transmitted to system 100 such that local logging systems may not be necessary. For example, if the services offered by first system 410 are changed, the application used to make such changes could transmit more detailed cross-system characteristics information, as required, to system 100. In addition to cross-linking information as discussed above, the application could also transmit information regarding the user that initiated such changes, the identity of the application, the identity of the task or event that caused such changes, etc. This more detailed cross-system activity could be transmitted synchronously or asynchronously and in near-time or queued.

Alternatively, no cross-system characteristics information may be transferred to system 100. In that case, system 100 can periodically monitor client systems, such as first system 410 and second system 420, and request the cross-system linking and/or more detailed cross-system characteristics information from the client systems.

In another embodiment, changes to business objects could be transmitted to system 100 for logging. For example, if the computing systems that make up the distributed system environments contain local change documents, then the local logging systems can transmit change messages containing data such as the identity of the origin of the cross-system activity and the identity of the business object that changed to system 100. For example, in reference to FIG. 4, a vendor, that maintains first system 410, may provide a product and/or service to a company that maintains second system 420. Additionally, an application running on second system 420 may require access to a sales business object that referenced data related to the vendor (e.g., prices of services offered by the vendor or specifications for products offered by the vendor, etc). If changes are made to the vendor data maintained by a vendor business object in first system 410, then the sales business object would be updated to reflect the changes. Local characteristics of these changes or updates could be recorded in the local change documents maintained by first system 410 and second system 420.

However, as discussed above, the information stored in these local change documents would not include cross-system characteristics of the activities and events that caused such logging. For example, the information stored in the local change document of second system 420, in response to the updating of vendor data by first system 410, would not include information such as notification that the updates originated from a change in vendor data in first system 410, the identity of the vendor business object on first system 410 that caused the change in vendor data, the identity of a user that initiated such changes, etc. Embodiments consistent with the invention may provide such information.

For example, in the example discussed above, when a change in a vendor business object in first system 410 is initiated, if first system 410 contained a local change document, then the local logging system would transmit a change message to system 100 for logging. Subsequently, this logged change message could be accessed to get more detailed cross-system characteristics of the cross-system activity if required (discussed below).

On the other hand, GUIDS may be assigned to the cross-system activities and stored in the local logging systems. For example, in the example discussed above, when a change in the vendor business object in first system 410 is initiated, the local logging system of first system 410 can generate a GUID for the cross-system activity. In this case, when first system 410 sends a message to second system 420 to notify second system 420 of the change in the vendor business object, first system 410 also transmits the GUID of the cross-system activity. Subsequently, this information is stored by the local logging systems of first system 410 and second system 420. Thereafter, the local logging system of first system 410 and second system 420 can be periodically monitored in order to correlate the logging of the cross-system activity in second system 420 with that of first system 410 and make a corresponding entry to cross-system log database 140.

Alternatively, more detailed cross-system characteristics information could be transmitted to system 100 such that local logging systems may not be necessary. For example, if a change occurs in the vendor business object of first system 410, the application used to make such changes could transmit more detailed cross-system characteristics information, as required, to system 100. For example, in addition to the change message as discussed above, the application could also transmit information identifying the user that initiated such changes, the identity of the application, the identity of the task or event that caused such changes, etc. This more detailed cross-system activity could be transmitted synchronously or asynchronously and in near-time or queued.

Alternatively, no cross-system characteristics information may be transferred to system 100. In that case, system 100 can periodically monitor client systems, such as first system 410 and second system 420, and request the cross-system linking and/or more detailed cross-system characteristics information from the client systems.

Returning to FIG. 3, computing platform 110 next electronically stores the received data in cross-system log database 140 (step S.20). Subsequently, computing platform 110 electronically receives a request locally or over a network from a user or a machine requesting access to the data (Step S.30). The request may come from a user or machine performing any business activity that may require such information, such as an audit, a troubleshooter, a financial analysis, etc. In response, computing platform 110 electronically provides the requested data to the requesting user or machine (Step S.40). For example, in reference to FIG. 4, if first system 410 and second system 420 contain local logging systems or local change documents, then computing platform 110 may provide the stored cross-linking information or change message to the requesting user or machine. In this embodiment, the requesting user or machine could then use the cross-linking information or change message to request more detailed information from the originating system.

Alternatively, computing platform 110 may request more detailed cross-system characteristics information from the originating system. For example, if a requesting user or machine desired to obtain information identifying the user that had initiated the change in services on first system 410 in the example above, computing platform 110 could determine, based on the stored cross-linking information, that the activity has originated on first system 410. Computing platform 110 may then request first system 410 to provide information stored in its local log identifying the user who had initiated the changes. First system 410 then can provide this information to computing platform 110, for example, by using an application program interface (API) provided by computing platform 110. Alternatively, first system 410 can display this information locally.

Alternatively, if first system 410 and second system 420 did not contain local logging systems or local change documents, then cross-system log database 140 would contain all the requested information. Computing platform 110 may then provide this information to the requesting user or machine.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a cross-system log in a distributed computer system environment having multiple computer systems, the method comprising:
   electronically transmitting an identifier, associated with a cross-system activity between a first system and a second system and comprising information including at least one update originating from a least one change in at least one service provided by the first system, an identity of the event that caused the at least one change, a time stamp of the cross-system activity, an identity of the at least one service, and identification data associated with a user that initiated the at least one change, from the first system to the second system, wherein at least one of the first system and second system provides the other system with a resource for completing a task, and the cross-system activity is generated upon a change in the resource;
   electronically storing the identifier in the first system and the second system;
   electronically receiving data in a third system, the data including cross-system characteristics of the cross-system activity and the identifier;
   electronically storing the data in the third system;
   electronically receiving a request, at the third system, to access the data; and
   electronically providing, by the third system, the requested data.

2. The method of claim 1, wherein the identifier is a globally unique identifier.

3. The method of claim 1, wherein electronically storing the data comprises storing the data in a database.

4. The method of claim 1, wherein:
   the cross-system activity resulted from a change initiated by a user.

5. The method of claim 1, wherein electronically receiving a request comprises receiving the request over a network.

6. A computer-implemented method for transmitting cross-system data for use in a cross-system log in a distributed computer system environment having multiple computer systems, the method comprising:
   electronically transmitting an identifier, associated with a cross-system activity between a first system and a second system and comprising information including at least one update originating from a least one change in at least one service provided by the first system, an identity of the event that caused the at least one change, a time stamp of the cross-system activity, an identity of the at least one service, and identification data associated with a user that initiated the at least one change, from the first system to the second system, wherein at least one of the first system and second system provides the other system with a resource for completing a task, and the cross-system activity is generated upon a change in the resource;
   electronically storing the identifier in the first system and the second system;
   electronically acquiring data at a third system including cross-system characteristics of the cross-system activity and the identifier, wherein the activity affects at least one of the first system and the second system; and
   electronically transmitting, by the third system, the data for storage in the cross-system log.

7. The method of claim 6, wherein:
   the cross-system activity resulted from a change initiated by a user.

8. A computer program product tangibly embodied in a non-transitory computer-readable storage medium, the computer program product including instructions for execution by a processor to perform a method for providing a cross-system log in a distributed computer system environment having multiple computer systems, the method comprising:
   electronically transmitting an identifier, associated with a cross-system activity between a first system and a second system and comprising information including at least one update originating from a least one change in at least one service provided by the first system, an identity of the event that caused the at least one change, a time stamp of the cross-system activity, an identity of the at least one service, and identification data associated with a user that initiated the at least one change, from the first system to the second system, wherein at least one of the first system and second system provides the other system with a resource for completing a task, and the cross-system activity is generated upon a change in the resource;
   electronically storing the identifier in the first system and the second system;
   electronically receiving data in a third system, the data including cross-system characteristics of the cross-system activity and the identifier;
   electronically storing the data in the third system; electronically receiving a request, at the third system, to access the data; and electronically providing, by the third system, the requested data.

9. The method of claim 8, wherein the identifier is a globally unique identifier.

10. The method of claim 8, wherein electronically storing the data comprises storing the data in a database.

11. The method of claim 8, wherein:
the cross-system activity resulted from a change initiated by a user.

12. The method of claim 8, wherein electronically receiving a request comprises receiving the request over a network.

13. A system for providing a cross-system log in a distributed computer system environment having multiple computer systems, the system comprising:
a component for electronically transmitting an identifier, associated with a cross-system activity between a first system and a second system and comprising information including at least one update originating from a least one change in at least one service provided by the first system, an identity of the event that caused the at least one change, a time stamp of the cross-system activity, an identity of the at least one service, and identification data associated with a user that initiated the at least one change, from the first system to the second system, wherein at least one of the first system and second system provides the other system with a resource for completing a task, and the cross-system activity is generated upon a change in the resource;
a component for electronically storing the identifier in the first system and the second system;
a component for electronically receiving data in a third system, the data including cross-system characteristics of the cross-system activity and the identifier; a component for electronically storing the data in the third system;
a component for electronically receiving a request, at the third system, to access the data; and
a component for electronically providing, by the third system, the requested data.

14. The system of claim 13, wherein the identifier is a globally unique identifier.

15. The system of claim 13, wherein the component for electronically storing the data comprises storing the data in a database.

16. The system of claim 13, wherein:
the cross-system activity resulted from a change initiated by a user.

17. The system of claim 13, wherein the component for electronically receiving a request comprises receiving the request over a network.

* * * * *